Patented May 10, 1927.

1,628,380

UNITED STATES PATENT OFFICE.

FRANK WILCOXON, OF ITHACA, NEW YORK, AND BENNETT GROTTA, OF TAMAQUA, PENNSYLVANIA, ASSIGNORS TO ATLAS POWDER COMPANY, OF WILMINGTON, DELAWARE, A CORPORATION OF DELAWARE.

PROCESS FOR THE MANUFACTURE OF SODIUM AZIDE.

No Drawing.   Application filed October 27, 1924.   Serial No. 746,247.

Our invention relates particularly to an improvement in the manufacture of sodium azide, the salt of hydrazoic acid which is commonly employed as a raw material for the production of other derivatives of hydrazoic acid, such as, for instance, the heavy metal azides which are used in detonator compositions.

Soon after it was discovered that hydrazoic acid could be produced by the action of nitrous acid on benzoyl-hydrazine, it was found that the reaction could be effected between hydrazine derivatives other than the benzoyl compound and various derivatives of nitrous acid, in accordance with the following type equation:

$$N_2H_4 + HNO_2 = HN_3 + 2H_2O.$$

Among the various processes that have been proposed for the production of hydrazoic acid or its derivatives is the reaction between hydrazine or its salts and an alkyl nitrite in an alkaline solution. On conducting an extensive study on this process we have found that two distinct modifications of this reaction are disclosed. These are as follows:

(a) The use of non-anhydrous reaction mediums.

(b) The use of practically anhydrous reaction mediums and ingredients.

The reaction in modification (a) may be expressed by the following equation.

$$N_2H_4.H_2O + C_2H_5NO_2 + NaOH = NaN_3 + C_2H_5OH + 3H_2O.$$

In this case a large part of the sodium azide stays in solution with other ingredients such as excess materials and by-products and the product is isolated by the addition of a mineral acid and absorbing the thus liberated hydrazoic acid in a solution of sodium hydroxide, according to the following equations:

(1) $2NaN_3 + H_2SO_4 = HN_3 + Na_2SO_4.$
(2) $HN_3 + NaOH = NaN_3 + H_2O.$

In modification (b) the reaction may be expressed as follows:

$$N_2H_4 + C_2H_5NO_2 + C_2H_5ONa = NaN_3 + 2C_2H_5OH + H_2O.$$

In this case practically anhdrous materials are employed such as absolute alcohol, highly concentrated hydrazine solutions and sodium ethylate instead of sodium hydroxide solutions. In this process sodium azide precipitates out of solution and may be isolated by filtering from the mother solution.

It is apparent that each of the above modifications has merits not possessed by the other. In the first, less costly raw materials are employed, but there is the necessity of isolating the azide by distillation of hydrazoic acid, an operation which is usually considered hazardous and which always involves loss of the product involved. In the latter, the sodium azide may be isolated by simple filtration but it is necessary to employ sodium ethylate which, in turn, requires the use of metallic sodium, a comparatively costly ingredient the handling of which also involves considerable hazard.

In our efforts to devise a process in which would be incorporated the merits of the two above mentioned modifications and having the deficiencies of neither, we have made the discovery which is the basis of this patent application.

We have found that excellent yields of sodium azide may be obtained with ease by bringing together in suitable proportions and proper concentrations hydrazine hydrate, an alkyl nitrite such as ethyl nitrite and an alcoholate solution such as is produced by the action of caustic soda on anhydrous ethyl alcohol. Furthermore, the sodium azide thus formed precipitates out in the mother solution in a high state of purity and may be removed by simple filtration.

Our method of producing sodium azide is indicated by the following example run:

One kilogram of hydrazine hydrate solution containing 500 grams of $N_2H_4$, is mixed with 7.49 kilograms of a solution of sodium hydroxide in absolute ethyl alcohol (7.5%); to this mixture, which is contained in a well-cooled receptacle, fitted with a reflux condenser, is added 1.76 kilograms of ethyl nitrite. After a few minutes a violent reaction sets in and pure white sodium azide is thrown out of solution. As the violence of the reaction subsides the mixture is allowed to come to room temperature and after standing for two hours the sodium azide is removed by the simple process of filtration. Upwards of 0.8 kilogram of sodium azide having a purity of 90% or higher is obtained. The product may be further purified by suitable washing or by crystallization.

In the above example run we have specified a concentration of alcoholate equivalent to 7.5% of sodium hydroxide in absolute alcohol. We have found that this concentration may be varied from five to ten percent without greatly affecting the efficiency of the process. We have also specified sufficient alcoholate solution to give approximately the theoretical requirements of sodium. Theoretical requirements of this ingredient are sufficient for an efficient reaction but an excess may be used. Also, since in cases where the sodium added as sodium hydroxide is deficient, or in theoretical quantity it is found to be practically all combined as sodium azide after the reaction, it is obvious that our invention is not impractical even when there is a considerable deficiency of sodium. Therefore, we claim that the use of only 75% of theory of sodium hydroxide is within the scope of our invention.

Furthermore we have specified a 50% solution of hydrazine. The concentration of this solution, also, may be varied at will. The concentration of hydrazine should, however, be sufficiently high to maintain a final ratio of hydrazine to water, including the water formed in the reaction, of at least one unit of hydrazine to three units of water. Hydrazine and hydrazine hydrate are equivalents in so far as this process is concerned. While we have specified a 50% excess of ethyl nitrite we have found that this excess may be varied at will.

In the above procedure we have specified the use of ethyl alcohol, sodium hydroxide, and ethyl nitrite. We have found, however, that the reaction proceeds equally well with other alcohols, other alkalies, and with other alkyl nitrites. For instance, methyl alcohol, potassium hydroxide, and amyl nitrite may be employed to yield potassium azide.

Having described our invention we claim:

1. The herein described process of manufacture of sodium azide which consists of bringing together hydrazine hydrate, an alkyl nitrite and a sodium alcoholate solution 2. The herein described process of manufacture of sodium azide which consists of bringing together hydrazine hydrate, an alkyl nitrite and an alcoholate solution produced by the action of caustic soda on anhydrous ethyl alcohol.

3. The herein described process of manufacture of sodium azide which consists of subjecting an anhydrous alcohol to the action of caustic soda and mixing the resulting solution with an aqueous solution of hydrazine and an excess of an alkyl nitrite 4. The herein described process of manufacture of sodium azide which consists of subjecting an anhydrous alcohol to the action of five to ten percent of caustic soda and mixing the resulting solution with an aqueous solution of hydrazine of such strength as to yield at least one unit of hydrazine to three units of water, and an excess of ethyl nitrite.

5. A process for the manufacture of alkali-metal azides, which consists of bringing together, in a suitable reaction chamber, a solution of a sodium alcoholate formed by the bringing together of from 5 to 10% of an alkali metal hydroxide and an anhydrous alcohol, and an aqueous solution of hydrazine containing sufficient hydrazine to give a ratio of at least one unit of hydrazine to three units of water, including the water formed in the reaction, and an excess of an alkyl nitrite.

In testimony whereof they affix their signatures.

FRANK WILCOXON.
BENNETT GROTTA.